H. B. & F. A. PICKETT.
SCATTERER ATTACHMENT FOR MANURE SPREADERS.
APPLICATION FILED NOV. 15, 1915.
1,194,226.
Patented Aug. 8, 1916
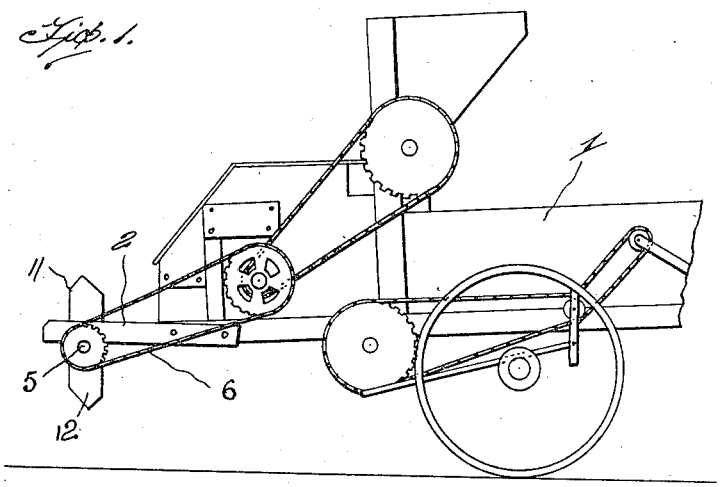
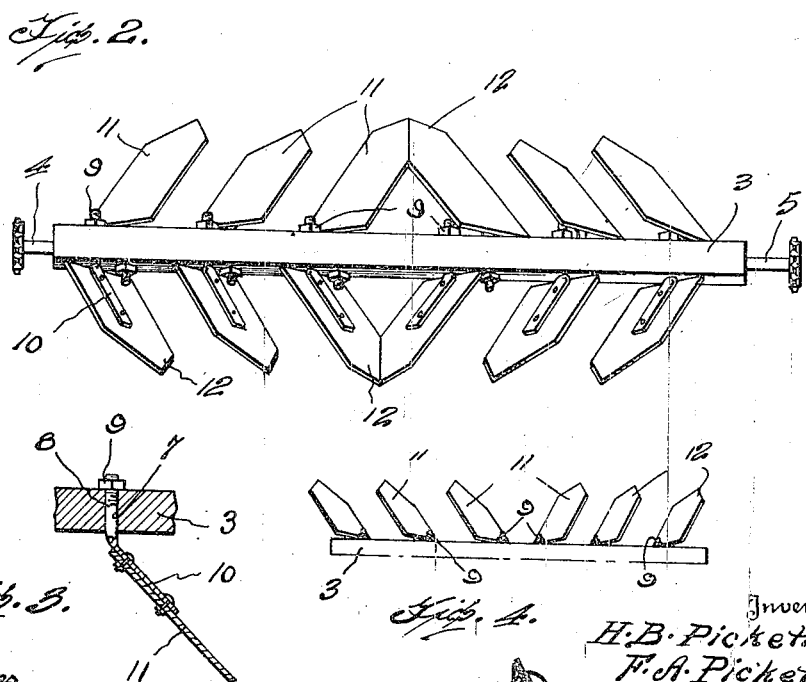
Inventors
H. B. Pickett.
F. A. Pickett.

UNITED STATES PATENT OFFICE.

HURDIE B. PICKETT AND FREDERICK A. PICKETT, OF BALTIMORE, MARYLAND.

SCATTERER ATTACHMENT FOR MANURE-SPREADERS.

1,194,226.  Specification of Letters Patent.  Patented Aug. 8, 1916.

Application filed November 15, 1915. Serial No. 61,576.

*To all whom it may concern:*

Be it known that we, HURDIE B. PICKETT and FREDERICK A. PICKETT, citizens of the United States, residing at Baltimore, in the State of Maryland, have invented certain new and useful Improvements in Scatterer Attachments for Manure-Spreaders; and we do hereby declare the following to be a full, clear, and exact description of the invention, such as will enable others skilled in the art to which it appertains to make and use the same.

This invention relates to a scatterer adaptable for attachment to and use in connection with various types of manure spreaders, and the primary object of the invention is to provide a scatterer as specified which will efficiently scatter the disintegrated particles of manure, a relatively wide distance upon each side of the manure retaining bed, for properly distributing the manure upon the surface of the field.

Another object of this invention is to provide a scatterer which includes a rotatable rectangular shaft having a plurality of sets of oppositely inclined scattering blades detachably secured thereto, so that they may be adjusted for inclining toward or from the transverse center of the shaft to scatter the manure in relatively wide or narrow swaths as desired, and further to arrange the scattering blades in conforming pairs diametrically opposite of each other upon the shaft and to incline the blades with respect to both the longitudinal and radial center of the shaft for increasing their scattering proclivities.

A further object of the invention is to arrange the innermost scattering blades of each set so that when the blades incline toward the transverse center of the shaft, the innermost blades of each set will throw the bulk of the manure to be scattered away from the center of the machine where a relatively larger amount of the manure is conveyed over the conveyer of the spreader, caused by the fact that the center of the load is always higher than the sides.

A still further object of this invention is to point the outer ends of the blades so that during the rotation of the scatterer the pointed ends of the blades will engage and disintegrate any relatively large particles of manure which have escaped being disintegrated by the shredding or disintegrating structure of the spreader.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts through the several views, and in which:

Figure 1 is a side elevation of the rear end of a manure spreader, showing the improved scatterer attached thereto, Fig. 2 is a plan view of the scatterer, and Fig. 3 is a sectional view shrough the scatterer, showing clearly the manner of attaching the scattering blades to the rotary shaft, Fig. 4 is a fragmentary view of the improved scatterer, showing the scattering blades inclined away from the transverse center of the shaft.

Referring more particularly to the drawings, 1 designates the rear end of a manure spreader to which the improved scatterer is attached. The rear end of the sides of the spreader 1 have rearwardly extending braces 2 attached thereto, which rotatably support the shaft 3. The shaft 3 is rectangularly shaped in cross section and is preferably constructed of wood, but it may be constructed of any desired material without departing from the spirit of this invention. The rectangular shaft 3 has stub shafts 4 and 5 attached to its ends and extending longitudinally from its central axis, which stub shafts are rotatably supported by the rearwardly extending bracket arms 2. The shaft 3 is rotated in any suitable manner, such as by the sprocket and chain structure illustrated at 6 in Fig. 1 of the drawings.

The shaft 3 is provided with a plurality of spaced diametrically extending openings 7, which openings receive the screw threaded shanks of bolts 8. The shanks of the bolts 8 project through the shaft 3 and have nuts 9 mounted thereon, which nuts are adapted for securely holding the bolts 8 in their proper position with respect to the shaft 3. The bolts 8 have their ends remote from the ends upon which the nuts 9 are mounted flattened and bent angularly to the screw threaded shanks thereof, as is clearly shown at 10 in Figs. 2 and 3 of the drawings. The flattened ends 10 of the bolts 8 are attached to the flat sides of scattering blades 11. The scattering blades 11 are arranged in sets, which sets incline oppositely to each other. The sets of the scattering blades, which are positioned diametrically opposite of each other, with respect to the shaft 3, incline correspondingly, as is clearly shown in Fig. 2 of the drawings.

The bolts 8 attach the scattering blades 11 to the shaft 3, so that when it is desired to scatter the manure in a relatively wide path beyond the sides of the retaining bed 1 of the manure spreader, the blades may be inclined toward the transverse center of the shaft 3, as is clearly shown in Fig. 2 of the drawing. The inclining of the blades toward the transverse center of the shaft 3 positions the innermost blades of each of the sets, so that they will throw the bulk of the manure outwardly, and prevent the scattering or depositing of a relatively heavy deposit of manure upon the center of the portion of the field over which the manure is being scattered and facilitating the even scattering of the manure.

When it is desired to scatter the manure in a relatively narrow path and heavy upon the field, the nuts 9 are loosened upon the bolts 8, which permits of the adjustment of the blades 11 for inclining them away from the transverse center of the shaft 3, which will cause the blades to throw the manure inwardly and deposit it in a relatively narrow path.

The outer ends of the blades 11 are cut angularly for pointing the blades. The pointed outer ends of the blades will engage and disintegrate any relatively large particles of manure which have escaped disintegration by the spreading or disintegrating structure of the manure spreader.

The inclining of the blades with respect to the radial axis of the shaft 3 increases the catching surface of the scatterer and consequently facilitates the scattering action of the same.

From the foregoing description, taken in connection with the accompanying drawing, it will be readily apparent, that a manure scatterer for use in connection with manure spreaders has been provided, which will efficiently scatter the threaded manure evenly over a field, and it is to be understood that if in practical use, certain minor features of construction of the spreader should need alterations, that such alterations may be resorted to provided they are comprehended within the scope of what is claimed.

What is claimed is:

1. The combination with a manure spreader, of a scatterer including a rotary shaft, sets of oppositely inclined scattering blades secured to said shaft and inclining toward the transverse center of the shaft.

2. The combination with a manure spreader, of a scatterer including a rotary shaft, sets of oppositely inclined scattering blades secured to said shaft and inclining toward the transverse center of the shaft, and a pair of correspondingly inclined sets of said scattering blades secured to said shaft diametrically opposite said first mentioned sets.

3. The combination with a manure spreader, of a scatterer including a rotary shaft, sets of oppositely inclined scattering blades secured to said shaft and inclining toward the transverse center of the shaft, a pair of correspondingly inclined sets of said scattering blades secured to said shaft diametrically opposite said first mentioned sets, the innermost of said scattering blades having their ends cut angularly, and said innermost blades of said oppositely inclined sets having their angularly cut ends abutting.

4. The combination with a manure spreader, of a scatterer including a rotary shaft, sets of oppositely inclined scattering blades secured to said shafts and inclining toward the transverse center of the shafts, said blades being inclined with respect to both the longitudinal and transverse centers of said shafts.

5. The combination with a manure spreader, of a scatterer including a rotary shaft, sets of oppositely inclined scattering blades secured to said shaft, a pair of correspondingly inclined sets of said scattering blades secured to said shaft diametrically opposite said first mentioned sets, said blades being inclined with respect to both the longitudinal and transverse centers of said shaft, said blades adapted for adjustment to incline toward or from the transverse center of the shaft.

6. The combination with a manure spreader, of a scatterer including a rotary shaft, sets of oppositely inclined scattering blades secured to said shaft, a pair of correspondingly inclined sets of said scattering blades secured to said shaft diametrically opposite said first mentioned sets, the outer ends of said blades being pointed, bolts attached to said blades and extending diametrically through said shaft, and nuts mounted upon the ends of said bolts for attaching said blades to said shafts.

7. The combination with a manure spreader, of a scatterer including a rotary shaft, sets of oppositely inclined scattering blades secured to said shaft, a pair of correspondingly inclined sets of said scattering blades secured to said shaft diametrically opposite said first mentioned sets, the outer ends of said blades being pointed, said blades adapted for adjustment to incline toward or from the transverse center of the shaft, said blades being inclined with respect to both the longitudinal and transverse centers of said shaft.

8. The combination with a manure spreader, of a scatterer including a rotary shaft, sets of oppositely inclined scattering blades detachably secured to said shaft, and adapted for inclining toward or away from the transverse center of the shaft.

9. The combination with a manure spreader, of a scatterer including a rotary shaft, sets of oppositely inclined scattering blades secured to said shaft and adapted for inclining toward or away from the transverse center of the shaft, said blades being inclined with respect to both the longitudinal and transverse centers of the shaft.

In testimony whereof we affix our signatures in presence of two witnesses.

HURDIE B. PICKETT.
FREDERICK A. PICKETT.

Witnesses:
MARY M. MAGRAW,
MARY E. UPMAN.